United States Patent [19]

Peterson et al.

[11] 4,045,152
[45] Aug. 30, 1977

[54] APPARATUS FOR MAKING CHEESE

[75] Inventors: Harold J. Peterson, Dodgeville; Wayne F. Kressin, Watertown, both of Wis.

[73] Assignee: Kusel Equipment Company, Watertown, Wis.

[21] Appl. No.: 609,304

[22] Filed: Sept. 2, 1975

[51] Int. Cl.² .................. A01J 25/13; A01J 25/15
[52] U.S. Cl. ............................ 425/419; 99/456; 100/193; 100/268; 425/434
[58] Field of Search ............ 100/116, 125, 221, 237, 100/295, 214, 229, 193; 99/456, 457, 458; 425/62, 84, 256, 419, 425, 428, 434; 426/512

[56] References Cited

U.S. PATENT DOCUMENTS

| 134,910 | 1/1873 | Martin | 100/116 |
|---|---|---|---|
| 203,345 | 5/1878 | Keim | 100/221 |
| 534,702 | 2/1895 | Steckler | 100/193 X |
| 2,362,154 | 11/1944 | Patrick | 100/125 |
| 2,604,036 | 7/1952 | Miollis | 100/237 |
| 3,030,878 | 4/1962 | Holzer | 100/237 |
| 3,337,920 | 8/1967 | Jagger et al. | 425/419 X |
| 3,421,220 | 1/1969 | Stanga | 425/434 X |
| 3,585,722 | 2/1969 | Legueux | 426/512 |
| 3,604,243 | 8/1971 | Muller | 100/214 |
| 3,761,215 | 8/1953 | Tondato | 100/268 |
| 3,808,772 | 5/1974 | Turtschan | 425/387 |
| 3,841,210 | 10/1974 | Brog | 99/456 |

FOREIGN PATENT DOCUMENTS

| 124,671 | 5/1948 | Australia | 100/193 X |
|---|---|---|---|
| 1,234,205 | 10/1960 | France | 99/456 |
| 2,032,060 | 11/1970 | France | 99/456 |
| 798,887 | 7/1958 | United Kingdom | 99/456 |

*Primary Examiner*—Francis S. Husar
*Assistant Examiner*—William R. Briggs
*Attorney, Agent, or Firm*—James E. Nilles

[57] ABSTRACT

An apparatus for filling cheese hoops with curd and for compressing the curd to form a finished cheese. The invention includes a hoop cart for supporting a plurality of generally cylindrical cheese hoops in closely spaced aligned arrangement and positioned such that they can each be filled from the top. The apparatus also includes filler trays which are receivable on the aligned cheese hoops to permit curds to be poured therein. Finally, the apparatus includes a vertically oriented press having a plurality of aligned downwardly movable plungers. The press is designed to receive the hoop cart and filler trays such that the plungers of the press are vertically aligned with the cheese hoops whereby the plungers may be forced downwardly into the cheese hoops to pack and to compress the curds therein. The plungers may then be removed from the hoops and the cart pulled from under the press such that the filler trays may be removed from the hoops. The carts may be returned to their position within the press and the plungers reinserted in the hoops and maintained under pressure until the finished cheese is formed.

6 Claims, 9 Drawing Figures

APPARATUS FOR MAKING CHEESE

BACKGROUND OF THE INVENTION

The present invention relates to apparatus for filling a plurality of longhorn cheese hoops with curd and then compressing the curd within the hoops until a finished cheese is formed.

The prior art method and apparatus used to make cheese in longhorns or cheese hoops in the quantities envisioned by the invention, generally required a procedure substantially as follows. The cheese hoops which comprise generally perforated stainless steel cylindrical containers are filled and packed by hand by an operator. The hoops are each weighed during the packing operation to insure that the proper amount of curd has been placed in each of the hoops in order to achieve consistency from one hoop to the next. the hoops are then individually lifted onto a cheese press and aligned in horizontal relation end to end between two press members. The hoops mutually engage each other in a telescoping relationship in end to end relation such that the curds within the hoops will be compressed when the hoops are axially compressed. The aligned hoops are placed under pressure by the press members acting on the opposite ends of the line of hoops to force the whey out of the curds and the pressure is maintained until a finished cheese is formed. When the cheese is finished the hoops and cheese are manually removed from the apparatus so that the finished cheese can be stripped from the hoops.

SUMMARY OF THE INVENTION

The apparatus of the present invention sets forth several substantial improvements over the prior art, reducing the manual labor required to produce the cheese and increasing the consistency and quality of the cheese produced. The invention is directed to the concept of placing a plurality of empty longhorn cheese hoops on a movable cart positioned such that they can be filled with curd and the curd compressed to form a finished cheese without being removed from the cart. This process avoids the manual labor required to fill and pack each of the hoops individually and to lift each of the filled hoops onto a pressing apparatus. The invention also avoids the necessity of weighing each of the hoops during the filling process.

The apparatus of the invention includes a movable cart which supports a plurality of cheese hoops placed adjacent to each other in closely spaced relation and aligned so that they can each be filled from the top. A filler tray is placed over the aligned hoops such that sleeve projecting downwardly from the bottom of the tray are received in each of the hoops. The cart and hoops may then be conveyed to a hopper containing curds such that curds can be poured into the tray and evenly distributed to each of the hoops. The sleeves received in the hoops extend several inches above the top of the hoops. The hoops and sleeves are filled to approximately the level of the top of the sleeves with each of the hoops containing substantially the same amount of curds. The cart containing the filled hoops and including the filler is then moved to be received under a vertical press. The press includes a plurality of downwardly extending plungers which are aligned to be received within the sleeves and hoops. The plungers are driven downwardly by pneumtic actuators into the sleeves to pack the curd therein into the hoop thereby compressing the curd. The plungers are then raised and the cart and hoops removed from the press so that the filler can be removed from the hoops. A piece of cheese cloth is then laid on top of the curd and a perforated circular metal disc is laid over the cheese cloth. The cart and filled hoops are then reinserted beneath the press and the plungers activated a second time to place a compressive force on the metal discs and on the curds. The plungers are maintained in compressive engagement for several hours or longer until the curds have been compressed sufficiently to form a finished cheese.

The plungers of the vertical press are supported from a press head which is in turn secured to the piston of the actuating cylinder. The plungers are each independently vertically slideably mounted in the press head but are biased downwardly by coil springs such that the pressure maintained by the plungers on the curd in each of the hoops is generally equal.

By using the apparatus of the invention, the cheese hoops can be moved from one work station to another on the movable cart such that it is not necessary to remove the hoops from the cart until the cheese making process has been completed. This substantially eliminates the manual labor formerly required to lift the filled hoops onto the press and removal of the hoops from the press following the pressing operation.

The apparatus of the invention also avoid the requirement that the hoops be weighed to insure the proper amount of curd has been placed in the hoops to maintain the consistency of the cheese produced. The hoops used in the present invention are each filled to generally the same level with curd and are simultaneously compacted by the plungers. Since the curd poured into each of the hoops is of a generally uniform consistency, the cheese produced in each of the hoops will be uniform using the method of the invention. The apparatus of the invention thus eliminate the need for additional labor to weight the hoops.

As is readily apparent, apparatus of the invention also reduces the time required to pack each of the cheese hoops with curd because a plurality of hoops can be filled simultaneously and because the packing of the curds into the hoops is accomplished by a single compression stroke of the vertical press plungers.

These and other advantages of the invention will become apparent from the following description of a preferred embodiment.

DESCRIPTION OF THE PREFERRED EMBODIMENT

Figure 1:
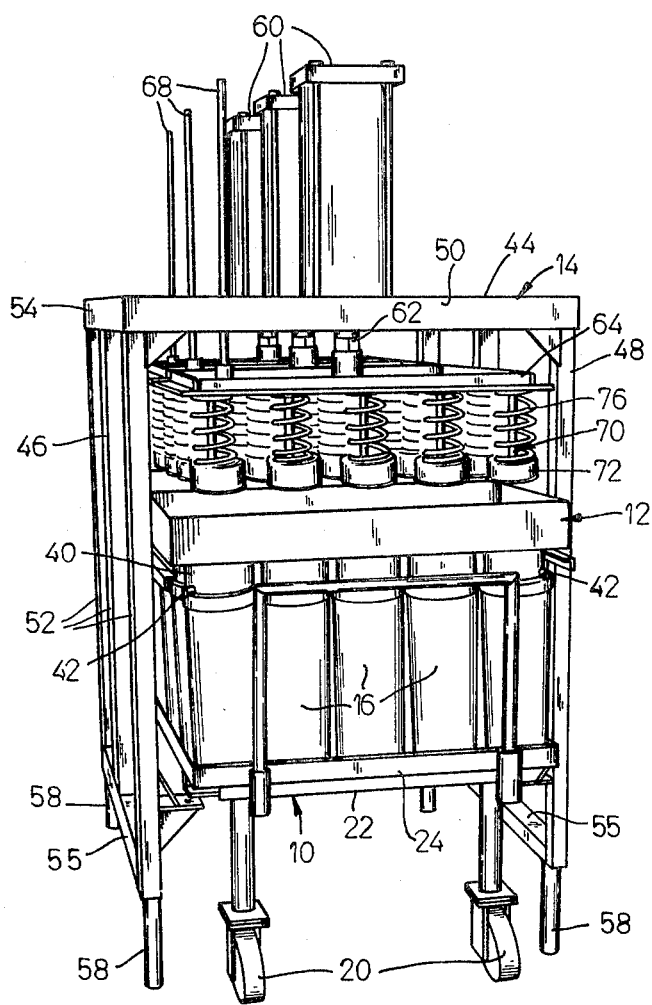
FIG. 1 is an isometric view of the present invention wherein the cart and filler tray are received within the vertical press.

The present invention is directed to apparatus for filling cheese hoops with curd, packing the curd in the hoops, and then compressing the curd for an extended period of time until a finished cheese is formed. The apparatus of the present invention is shown in FIG. 1 as generally including a movable hoop cart 10 for supporting the cheese hoops 16, a plurality of filler trays 12 which facilitate filling of the hoops with curds and a vertical press 14 for packing and compressing the curds in the hoops.

Figure 2:
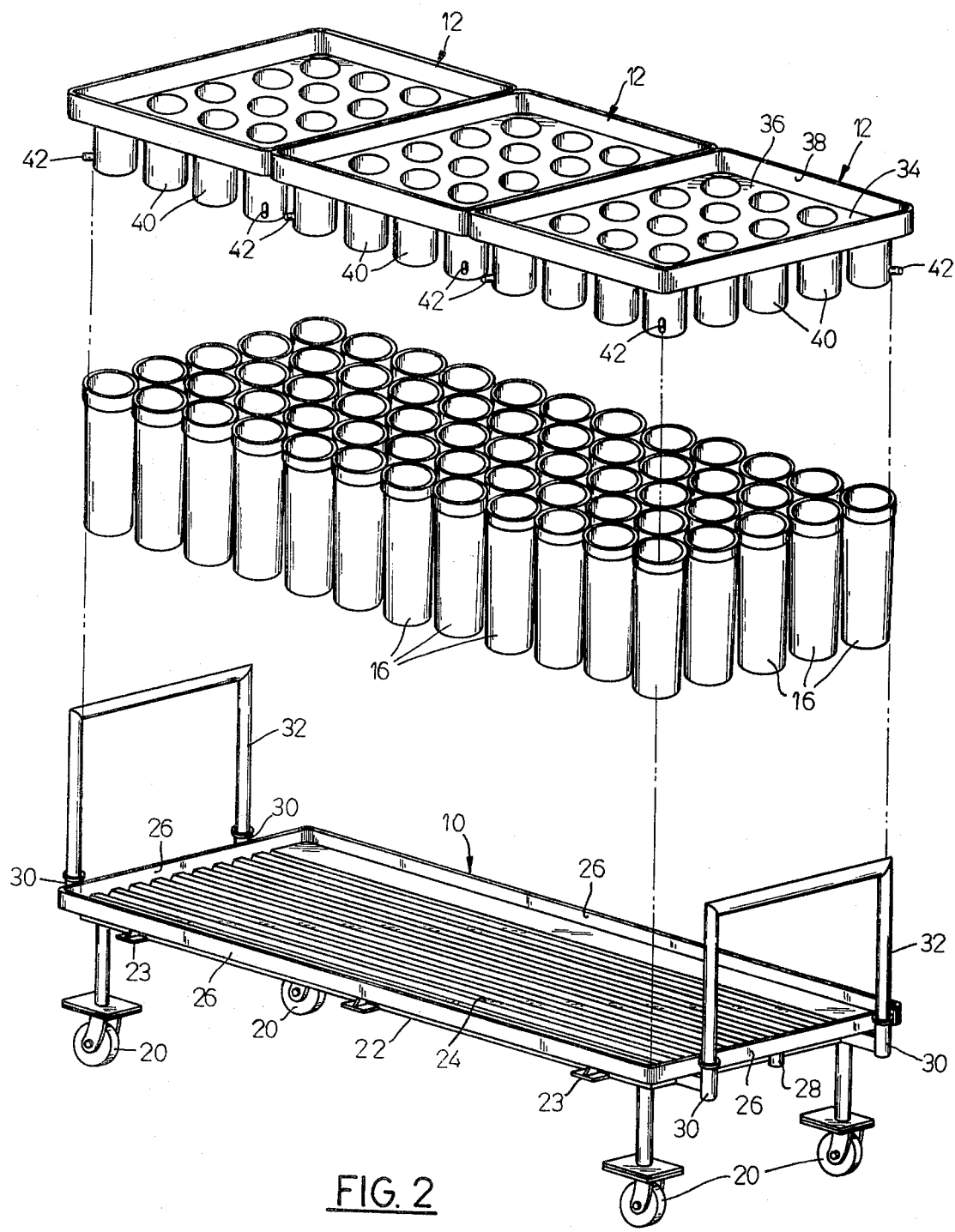
FIG. 2 is an exploded isometric view of the cart, the cheese hoops and filler trays of the invention.

The cart 10, which is best shown in FIG. 2, consists of a horizontally extending frame 22 which is supported on four wheels 20. The frame 22 supports a corrugated tray 24. The corrugated tray 24 includes vertically extending side walls 26 surrounding its periphery and a whey outlet 28. The whey outlet 28 may be connected to a receptical for receiving whey which is forced out of the curd during the cheese making process. The rectangular tray 24 is of such dimension that a plurality of hoops 16 can be placed on the tray in closely spaced adjacent relationship and held in such relationship by the side walls 26. The hoops 16 used with the apparatus of the invention are approximately 6 inches in diameter and are sufficiently long to hold 12 or more pounds of curd. The rectangular tray 24 shown in the drawings is of sufficient size to support 60 hoops in adjacent position and arranged in five rows. The cart 10 also includes a pair of circular bushings 30 secured to and extending from each of its ends for receiving the lower ends of cart handles 32. The cart handles 32 are generally rectangular and are useful to permit the cart 10 to be pushed from one station to another by the operator.

Figure 4:
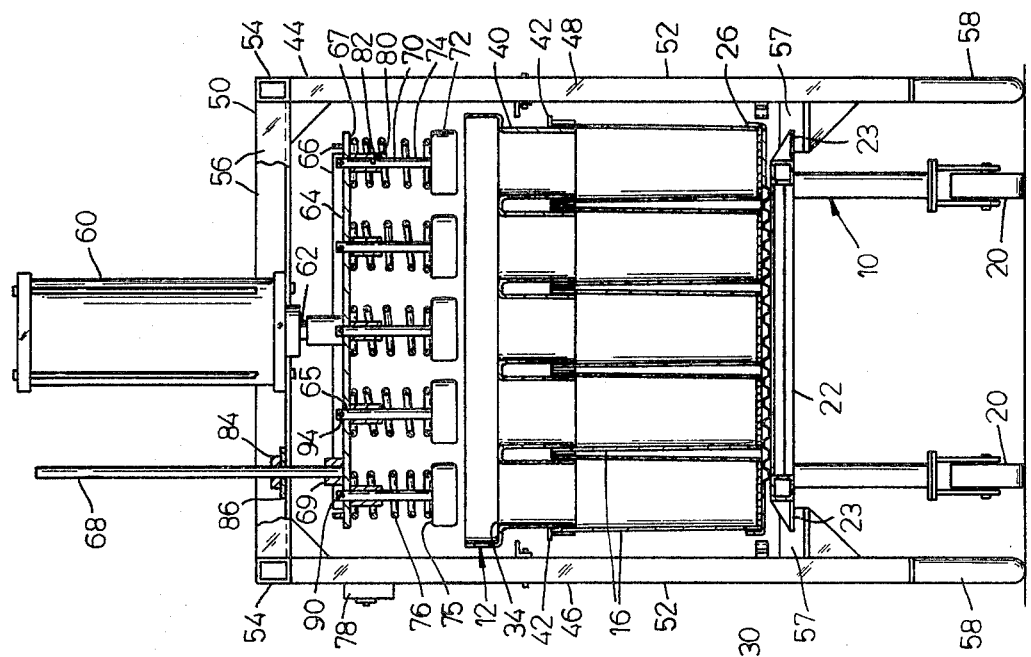
FIG. 4 generally shows a cross-sectional end view of the cart and the filler trays received within the vertical press.
Figure 3:
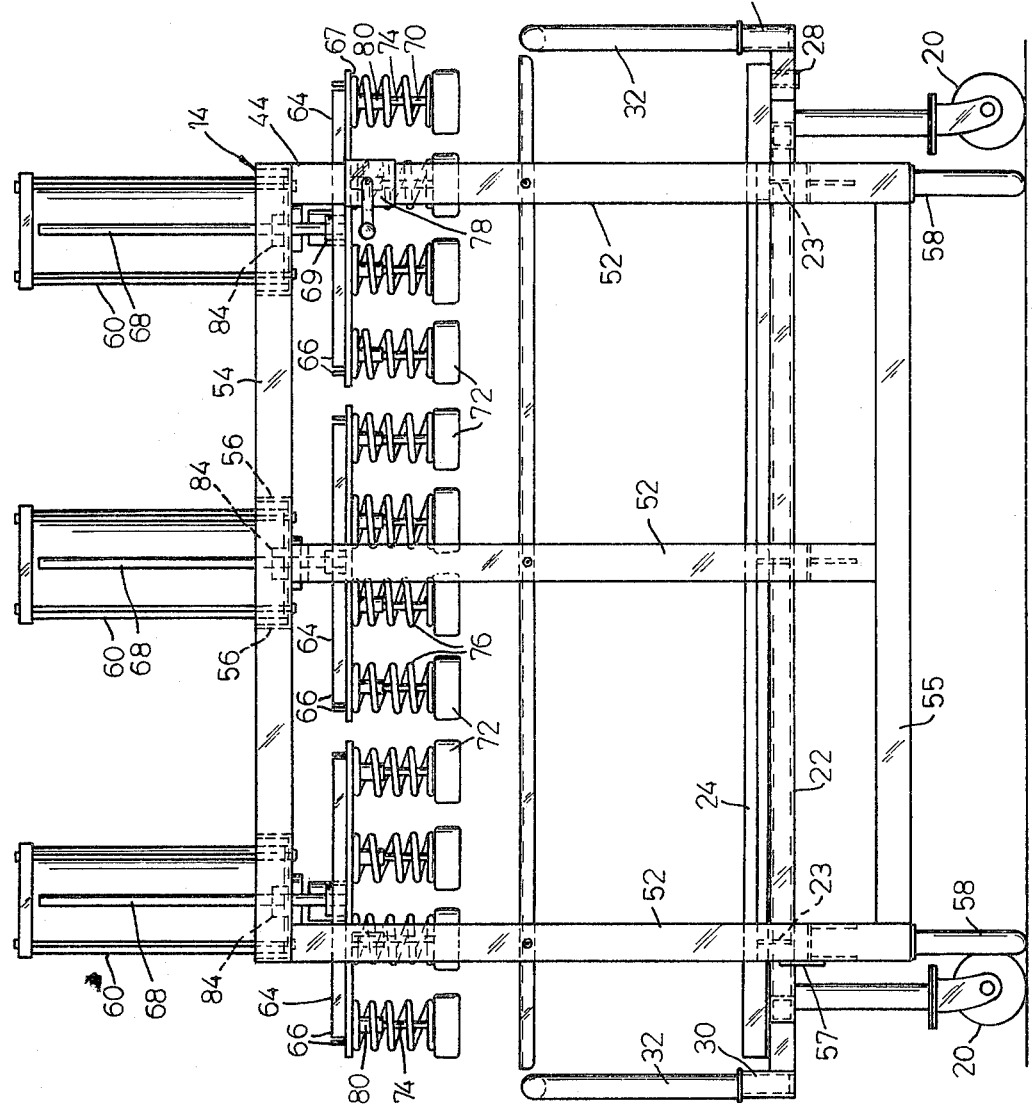
FIG. 3 is a side elevation view of the cart received within the vertical press but without the cheese hoops and filler trays being shown.

Three adjacent filler trays 12 are provided to be received on top of the hoops 16 to facilitate the filling of the hoops with curds. Each of the fillers 12 includes a tray like portion 34 having a bottom wall 36 and vertical side walls 38. A plurality of downwardly extending cylindrical sleeves 40 project from the lower side of the bottom wall 36. As shown in FIG. 4, when the filler 12 is placed upon the hoops 16, the sleeves 40, which have an outside diameter slightly smaller than the inside diameter of the hoops 16, are received within the upper portions of the hoops and are designed to permit curds which are poured into the tray 34 to be funneled into the hoops. The sleeves 40 of the filler 12 which are positioned at the corners, each include radially outwardly extending pins 42 which are intended to rest upon the upper surface of the hoops 16 to maintain the proper positioning of the filler tray 12 on the hoops. It should be noted that the sleeves extend several inches above the upper edge of the hoops 16.

Figure 5:
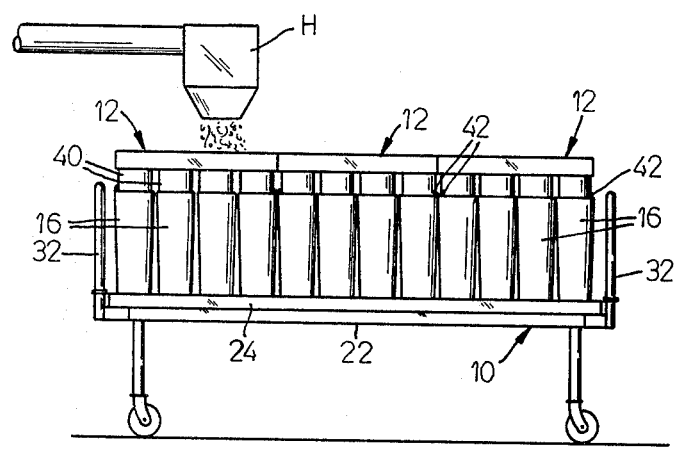
FIGS. 5–9 are schematic views illustrating the process for filling the cheese hoops with curd and for compressing the curd using the vertical press of the invention.
Figure 6:
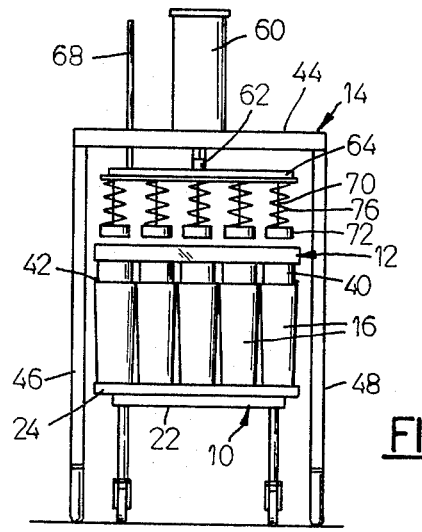
Figure 7:
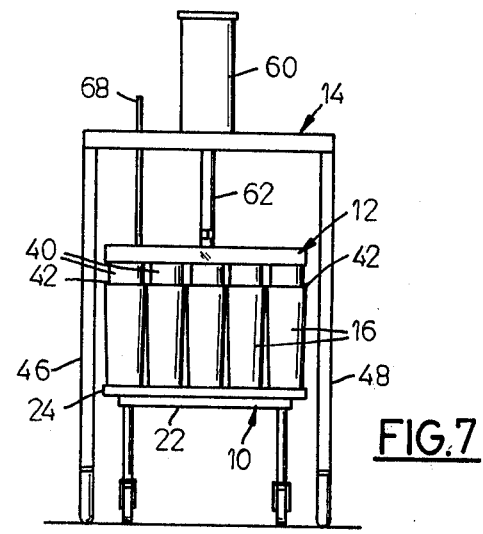
Figure 8:
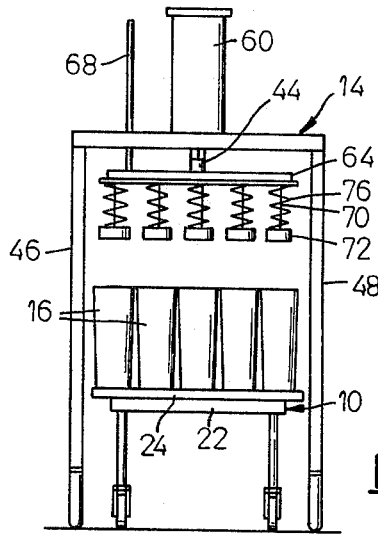
Figure 9:
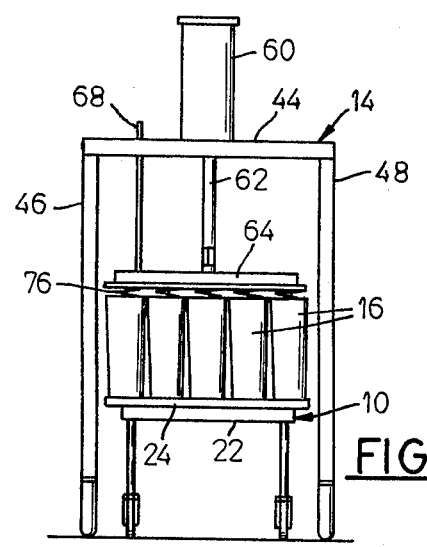

As illustrated in FIG. 5, the filler trays are designed to facilitate the filling of the hoops 16 with curd from a hopper H. The cart 10 supporting the hoops 16 and the filler trays 12 is moved by the operator to a position below a hopper such that curds can be poured into the filler tray 34. The vertically extending walls 38 are approximately 3 inches high and prevent spillage of the curds during the filling operation. The operator controls the flow of curds into the tray such that the hoops 16 and sleeves 40 are filled to the desired level, for example, to the level of the bottom wall of the filler tray 12.

Though the apparatus shown in the drawings illustrates the use of 60 hoops and three fillers 12, it should be readily apparent that the invention includes within its scope any desired number of hoops 16.

When the hoops 16 have been filled with curd, the cart 10 is moved to a position where it is received within the vertical press 14. The vertical press comprises a frame generally depicted as element 44 and consisting of a pair of spaced vertically extending side walls 46 and 48 which are joined by a bridge 50 extending between the upper portions of the side walls. Each of the side walls 46 and 48 are comprised of three vertically extending rectangular tubes 52 joined by horizontally extending rectangular tubes 54 and 55 welded to the upper and lower ends of the vertically extending rectangular tubes 52, respectively, thereby forming a rigid structure. The bridge 50 extending between the side walls 46 and 48 is comprised of three pairs of opposed horizontally extending angles 56 which are rigidly attached to the upper ends of the side walls so as to thus form, with the side wall 46 and 48, a rectangular arch capable of receiving therein the cart 10 and hoops 16 during the pressing operation. Each of the side walls 46 and 48 of the frame is supported by legs 58. In order to provide means for accurately aligning the position of the cart with respect to the vertical press, a pair of projections 57 extend inwardly from the vertical side walls 46 and 48 and are positioned to contact the projections 23 extending outwardly from the cart frame 22.

The angles 56 are arranged in three opposed pairs, each of said pairs supporting a pneumatic cylinder 60. The pneumatic cylinders 60 are supported by the angles 56 such that a pneumatically actuated piston rod 62 extends downwardly between the side walls 46 and 48 and equidistant therefrom. The lower end of each of the piston rods 62 is journalled in fixed relationship to a horizontal press head 64. The press head 64 includes a plurality of vanes 66 welded to its upper surface to increase its rigidity and a plurality of vertically extending spaced bores 65 for slideably receiving plungers 70 which extend downwardly from the bottom surface 67 of the press head. The plungers 70 are comprised of a plunger head 72 which is defined by a generally cylindrical disc of an outside diameter substantially equal to but receivable within the inside diameter of the sleeve 40. The plungers 70 also include a plunger rod 74 which is slideably received within one of the spaced bores 65 of the press head 64 as stated for vertical movement with respect to the press head. The plungers 70 are each guided in their vertical movement by a cylindrical guide 80 secured to the bottom surface 67 of the press head 64 and including a bore 82 in alignment with the spaced bores 65.

In order to maintain the proper alignment of the press head 64 and the plungers 70 with the sleeves 40 and hoops 16 a guide rod 68 is secured to the upper surface 69 of the press head and extends perpendicularly upwardly from the press head such that it is slideably receivable in a bushing 84 supported by a bracket 86 which is in turn secured between the two angles 56 supporting the pneumatic cylinder 60.

The plungers 70 are biased downwardly with respect to the press head 64 by coil spring 76 which surround the plunger rod 74 and which are compressed between the upper surface 75 of the plunger head 72 and the bottom surface 67 of the press head 64. The plungers 70 are limited however in their downward movement by cotter pins 90 extending through transverse bores 94 in the upper ends of the plunger rod 74 for abutment with the upper surface 69 of the press head 64.

During the operation of the apparatus of the invention, after the hoops 16 and sleeves 40 have been filled to the desired level with curd, the cart 10 supporting both the filled hoops 16 and the filler 12 is moved by the operator so as to be received within the vertical press 14 between the side walls 46 and 48 in such a manner that the plungers 70 are aligned with the sleeves 40 and the hoops 16. The operator activates valve 78 causing the pneumatic cylinder 60 to force the press heads 64 downwardly and to force the plungers 70 into the sleeves 40. Downward movement of the plungers in the sleeves 40 packs the curd held in the sleeves downwardly into the hoops 16 and compresses the curd. The force applied by the plungers 70 on the curd in each of the hoops 16 is substantially equal despite variations in the level of the curd in the hoops because of the equalizing effect of the coil springs 76.

After the curd has been thus compressed, valve 78 is again actuated by the operator to lift the press heads 64 and to remove the plungers from the hoops 16 and the sleeves 40. The cart 10 is then removed from the vertical press 14 to permit removal of the fillers 12. Circular pieces of cheese cloth are then placed in the hoops over the cheese and overlaid by circular perforated metal discs. The cart is then resinserted into the vertical press 14 such that the plungers 70 are again aligned with the hoops 16. Valve 78 is actuated to force the press heads 64 downwardly and to force the plungers 70 into compressive engagement against the circular perforated metal disc. The pressure is maintained on the discs for several hours or until the curds have been compressed sufficiently to complete the cheese making process. It should be noted that a particular advantage of the present invention is that the pressure applied by each of the plungers during the final compression process can be maintained at a substantially equal value due to the use of the coil spring 76 even though the level of the cheese in the hoops may vary slightly. Thus results in the production of cheeses which are substantially equal in consistency and quality. When the process has been completed the plungers may be removed from the hoops and the cart 10 removed from the vertical press to permit the finished cheese to be stripped from the cheese hoops 16.

RESUME

The present invention thus sets forth apparatus for making cheese which requires substantially less manual effort than prior art processes and produces a plurality of finished cheeses simultaneously having a uniform quality. The invention is a substantial improvement over the prior art because it provides means for filling a large number of cheese hoops during a single step and in such a manner that the cheese hoops will each contain the same amount of cheese curds, thereby yielding cheeses which have a uniform weight, consistency, and quality. The invention also provides means to avoid the manual labor previously required to pack the cheese hoops with curd and required to move the filled hoops from one work station to another during the processing of the cheese. Finally, the invention sets forth means of maintaining equal pressures on the curds in each of the cheese hoops thereby insuring the consistency of each of the cheeses formed.

We claim:

1. A cheese processing apparatus comprising a cheese hoop supporting structure; a plurality of cheese hoops supported by said supporting structure in adjacent closely spaced relationship for receiving curds and whey to be poured therein; filler means removably connected to said cheese hoops to permit filling of said cheese hoops, said filler means including a tray having upwardly extending side walls, a bottom wall and a plurality of adjacent sleeves projecting downwardly from said bottom wall and receivable within said cheese hoops, whereby curds and whey may be directed from said tray into each of said cheese hoops through said sleeves; and a vertical cheese press for compressing curds placed within said cheese hoops, said vertical press including a frame receiving said movable cheese hoop supporting structure and a force applying means supported by said frame; press head means suspended from said force applying means and operably connected to said force applying means for vertical movement; and a plurality of downwardly extending plunger means supported by said press head means for vertical movement therewith, each of said plunger means being receivable through a sleeve in one of said cheese hoops for compressing curds in said cheese hoop, means for independently shiftably supporting said plunger means on said press head means for vertical movement with respect to said press head and to other of said plunger means, and spring biasing means between each of said plunger means and said press head urging said plunger means downwardly with respect to said press head means, whereby the cheese within each of said hoops will be compressed uniformly.

2. The cheese press set forth in claim 1 wherein said force applying means is a fluid actuated cylinder secured to said frame and includes a piston secured to said press head.

3. Apparatus for processing curd to form cheese comprising a support structure; a plurality of cheese hoops on said structure; filler means removably connected to fill said cheese hoops and comprising a tray having a plurality of sleeves extending downwardly into said cheese hoops; and a cheese press comprising a frame; a force applying means on said frame; a press head disposed above said cheese hoops and connected to and movable vertically by said force applying means; a plurality of plungers extending downwardly from and vertically movable with said press head through said sleeves and into said cheese hoops; means supporting each of said plungers on said press head for independent vertical movement with respect to said press head and with respect to other plungers; and spring biasing means between each of said plungers and said press head urging each of said plungers downwardly with respect to said press head but enabling independent positioning of each plunger whereby curds in each of said hoops are uniformly compressed.

4. Apparatus according to claim 3 wherein said support structure is relatively movable into and out of operating relationship with respect to said cheese press.

5. Apparatus according to claim 3 wherein said force applying means comprises a fluid motor connected between said frame and said press head.

6. Apparatus for processing curd to form cheese comprising a movable cheese hoop supporting structure; a plurality of cheese hoops supported by said supporting structure; filler means removably connected to said cheese hoops to facilitate filling thereof with curds and whey, said filler means comprising a tray having a bottom wall, upwardly extending side walls and a plurality of sleeves projecting downwardly from said bottom wall into said plurality of sleeves projecting downwardly from said bottom wall into said plurality of cheese hoops and comprising a frame; a force applying means including a fluid motor on said frame; a press head means disposed above said plurality of cheese hoops and vertically movable by said force applying means; a plurality of plunger means extending downwardly from and vertically movable with said press head means through said plurality of sleeves and into said plurality of cheese hoops; means supporting each of said plunger means on said press head means for independent vertical movement with respect to said press head means and with respect to other of said plunger means; and spring biasing means between each of said plunger means and said press head; urging each of said plunger means downwardly with respect to said press head means but enabling each of said plunger means to assume an independent position whereby curd in each of said plurality of hoops is uniformly compressed.

* * * * *